United States Patent Office 2,992,230
Patented July 11, 1961

2,992,230
PROCESS FOR THE PRODUCTION OF
SUBSTITUTED IMIDAZOLINES
George A. Lescisin, Chevy Chase, Md., assignor to Union Carbide Corporation, a corporation of New York
No Drawing. Filed July 7, 1959, Ser. No. 825,399
13 Claims. (Cl. 260—309.6)

This invention relates to a process for the production of substituted imidazolines. More particularly, the present invention relates to an improved process for the production of substituted imidazolines from ethylenediamine or substituted ethylenediamines and organic acids. The invention is particularly concerned with an improved process for the production of 2-heptadecyl-2-imidazoline from ethylenediamine and stearic acid.

It is known that substituted imidazolines can be prepared by reacting ethylenediamine with an organic acid in presence of a catalyst and/or a dehydrating or entraining agent. In the processes which employ a dehydrating or entraining agent such as benzene, toluene, or diisopropyl ether, a long reaction time is required in order to remove the water of reaction so that an adequate yield of product can be obtained. When catalysts, such as hydrogen chloride or magnesium chloride, are employed, a catalyst removal step is necessary, involving either neutralization or cumbersome filtration.

I have discovered an improved process for the production of substituted imidazolines, whereby high yields of high purity product can be efficiently and economically obtained. In accordance with my invention, substituted imidazolines can be produced in less time and with less effort than by the known processes and without the use of any of the catalysts or dehydrating agents which are associated with the known processes.

It is a distinctive feature of this invention that no reaction agent is present during the reaction of the monocarboxylic acid with the ethylenediamine or substituted ethylenediamine. The term "reaction agent" as used throughout this specification includes catalysts, such as hydrogen chloride or magnesium chloride, and dehydrating or entraining agents, such as benzene, toluene or diisopropyl ether. In addition to eliminating the cost of a reaction agent itself, by conducting the reaction in the absence of a reaction agent, at least one additional operation for the removal of the agent is also eliminated. Furthermore, by conducting the reaction in the absence of a reaction agent, I have unexpectedly found that excellent yields of substituted imidazolines can be obtained in a much shorter reaction time than has previously been required. Thus, the process of my invention provides a more efficient, productive and economic method for making substituted imidazolines than is now known in the art.

The process of my invention comprises bringing ethylenediamine or a substituted ethylenediamine and a monocarboxylic acid, such as stearic acid, into reactive admixture in a mol ratio, respectively, of from 2 to 1 to 10 to 1, and preferably from 3 to 1 to 6 to 1, at a temperature of from about 150° C. to about 350° C. and a pressure of from about 25 to about 750 p.s.i.g. for a period of from about 8 minutes to about 10 hours in the substantial absence of any reaction agents. Preferably, the reaction is conducted in the absence of air.

The reaction may be conducted in either a batchwise manner or in a continuous manner.

When the reaction is conducted in a batchwise manner, the following conditions should be present:

The ethylenediamine or substituted ethylenediamine is brought into reactive admixture, in batchwise manner, with a monocarboxylic acid, such as stearic acid, in a mol ratio, respectively, of from 2 to 1 to 10 to 1, and preferably from 3 to 1 to 5 to 1, at a temperature of from about 150° C. to about 350° C., and preferably from about 160° C. to about 180° C., and a pressure of from about 25 to about 750 p.s.i.g., and preferably from about 40 to about 60 p.s.i.g., for a period of from about 3 to 10 hours, and preferably from about 3 to 6 hours, in the substantial absence of any reaction agents. Preferably, the reaction is conducted in the absence of air.

The batchwise reaction may be carried out in any suitable vessel, such as a kettle equipped with an agitator, a linear or coiled tubular converter, or a column packed with Raschig rings, carbon rings, glass, or stainless steel packing. After the reaction has been conducted for from 3 to 10 hours, the effluent from the reaction zone may be passed into a flash-evaporator maintained at atmospheric or reduced pressure and at the temperature of the effluent. The flash-evaporator may consist of an ordinary still kettle, or a falling-film type or molecular still system, a kettle equipped with an agitator, a heated column packed with ordinary packing, such as, Raschig rings, carbon rings, glass or stainless steel packing. The vapors from the flash-evaporator may pass through a total vapor-make still head. An entrainment separator is preferably present for incorporation in the vent line from the flash-evaporator still to prevent the carrying-over of reaction product with the recovered ethylenediamine. The residue product from the flash-evaporator may then be passed to a refining still, which may be any suitable kettle, or a packed column, a falling-film or a molecular still system. The refining may be carried out at a kettle temperature of 200° to 350° C. at a reduced pressure of 1 to 5 mm. Hg. If desired, the reaction and distillations may be carried out in a single vessel.

The residue (defined as ethylenediamine distearamide) from the refining still may be utilized further by mixing with stearic acid and then reacting with ethylenediamine in substantially the same manner as described above, in order to increase the over-all yield and efficiency of the process.

When the reaction is conducted in a continuous manner, the following conditions should be present:

Ethylenediamine or a substituted ethylenediamine and a monocarboxylic acid, such as stearic acid are continuously brought into a reactive admixture in a mol ratio, respectively, of from 2 to 1 to 10 to 1, and preferably from 3 to 1 to 6 to 1, at a temperature of from about 250° C. to about 350° C., and preferably from about 325° C. to about 340° C., and a pressure of from about 25 to about 750 p.s.i.g., and preferably from about 90 to about 130 p.s.i.g., with a residence time of 8 to 60 minutes and preferably 10 to 30 minutes, in the substantial absence of any reaction agents. Preferably, the reaction is conducted in the absence of air.

The continuous reaction may be carried out in any suitable vessel such as a kettle equipped with an agitator, a linear or coiled tubular converter, or a column packed with Raschig rings, carbon rings, glass, or stainless steel. After the reaction has been conducted for from 10 to 60 minutes and at a pressure automatically regulated to 90 to 130 p.s.i.g., the effluent from the reaction zone may be passed into a flash-evaporator maintained at atmospheric or reduced pressure at the temperature of the effluent and with a residence time of 30 to 75 minutes. The effluent from the reactor may be passed to a flash-evaporator, which may consist of an ordinary still kettle, a falling-film type or molecular still system, a kettle equipped with an agitator, a heated column packed with ordinary packing, such as, Raschig rings, carbon rings, or glass or stainless steel packing. The flash-evaporator may be vented through a total vapor-make still head. An entrainment separator is recommended for incorporation in the vent line from the flash-evaporator still to prevent the carrying-over of reaction product with the recovered ethylenediamine. The residue product from the flash-evaporator may then be passed into a "weathering" still for cyclization of N-(2-aminoethyl)stearamide to 2-heptadecyl-2-imidazoline at a temperature of 250° C. to 300° C. and at a pressure of atmospheric pressure to 250 p.s.i.g. and at a residence time of 30 to 60 minutes. The "weathering" still may consist of a kettle equipped with an agitator, a linear or coiled tubular converter, a column packed with conventional packing, such as, Raschig or carbon rings, or glass or stainless steel packing. The "weathering" system may be vented through a column packed with similar packing to the "weathering" still or may be vented through a total vapor-make still head. The residue from the "weathering" still may be passed to a refining still maintained at a kettle temperature of 225° to 300° C. at a pressure of 1 to 5 mm. Hg. The refining still may consist of any suitable vessel, such as a kettle equipped with an agitator, a packed column, a falling-film, or a molecular still system.

The residue (comprising ethylenediamine distearamide) from the refining still may be utilized further by mixing with stearic acid and then reacting with ethylenediamine in a similar manner to that described above in order to increase the over-all yield and efficiency of the progress.

The following examples are illustrative:

*Example I*

The preparation of 2-heptadecyl-2-imidazoline was carried out in the absence of reaction agent by the batchwise reaction of stearic acid and ethylenediamine. The reaction was conducted in a stainless steel pressure still comprising a twelve-liter, round-bottom, three-necked kettle, heated with a Glas-Col mantle, a 2-inch I.D. three and one-half-foot column, a still head and a condenser. The column was packed with ¼-inch perforated stainless steel packing.

The kettle was charged with 600 grams (10 mols) of ethylenediamine and 722 grams (2.5 mols) of triple pressed stearic acid, after which the still system was purged with nitrogen and heated (for approximately one and one-half hours) until the temperature of the kettle charge reached 250° C. at an autogenous pressure of approximately 300 p.s.i.g. The system was operated under total reflux at a temperature of 250° C. The kettle contents were maintained under these conditions for one hour, after which they were cooled to 100° C. at atmospheric pressure and then were charged to a refining still for distillation.

The refining still comprised a 2-liter round-bottom, three-necked glass kettle equipped with a thermowell, a 32 mm. by 360 mm. glass column packed with ¼-inch stainless steel perforated packing, a still head provided with an overhead vapor line, a steam jacketed condenser, and a heated receiver. The distillation in the refining still was carried out at a kettle temperature of from 115° C. to 315° C. at an absolute pressure of 2 to 5 mm. Hg. A fore-fraction of 560 grams, representing 43.5 percent by weight of the charge to the refining still and comprising ethylenediamine and water, was produced at a vapor temperature of from 115° to 230° C. and at a pressure of from atmospheric to 5 mm. Hg. A refined product of 584 grams, representing 45.3 percent by weight of the still charge, was collected at a vapor temperature of 230° C. to 240° C. and at a kettle temperature of 275° C. to 315° C. at a pressure of 2.5 to 5 mm. Hg. The residue amounted to 145 grams, representing 11.2 percent by weight of the still charge. The refined product analyzed as follows: 2-heptadecyl-2-imidazoline, 97.2 percent by weight; N-(2-aminoethyl)-stearamide, 0.7 percent by weight; and stearic acid, 1.9 percent by weight. The residue product analyzed 9.2 percent by weight of 2-heptadecyl-2-imidazoline; nil percent of N-(2-aminoethyl)-stearamide, 4.2 percent by weight of stearic acid, and 86.6 percent by weight of ethylenediamine disteramide. Based on stearic acid, the yield of 2-heptadecyl-2-imidazoline was 75.3 percent by weight and based on ethylenediamine, the efficiency was 81.0 percent.

*Example II*

The preparation of 2-heptadecyl-2-imidazoline was carried out in the absence of a water entraining agent by a plant batchwise reaction between stearic acid and ethylenediamine in stainless steel still system comprising a 6000-gallon capacity vessel heated by a calandria using 600 p.s.i.g. steam, a 4-foot diameter column containing 5 trays, a still head, and a condenser.

After 255 pound-moles of 90 percent ethylenediamine and 86.5 pound moles of triple-pressed stearic acid were charged to the reaction vessel at ambient temperature, the still system was purged with nitrogen, and heated under total reflux at a kettle temperature of 165° to 175° C. and at a pressure of 48 p.s.i.g. for eight hours. Ethylenediamine and water were distilled without reflux up to a kettle temperature of 250° C. The mixture was maintained at a kettle temperature of 250° C. at a reduced pressure of 40 mm. Hg for 3 hours. The crude residue product analyzed as follows: 2-heptadecyl-2-imidazoline, 55 percent by weight; N-(2-aminoethyl)stearamide, 5 percent by weight; stearic acid, 0.5 percent by weight; ethylenediamine distearamide, 39.5 percent by weight. The above residue was charged to a stainless steel refining still system comprising a 6000-gallon capacity vessel heated by a calandria using 600 p.s.i.g. steam, an entrainment separator, and a receiver. The refining distillation was carried out at a vapor temperature of 215° C. to 220° C. at a kettle temperature of 230° to 245° C. and at a pressure of 1 to 2 mm. Hg. The refined product analyzed as follows: 2-heptadecyl-2-imidazoline, 99.0 percent by weight; N-(2-aminoethyl)stearamide, 0.7 percent by weight; stearic acid, 0.3 percent by weight. The residue product analyzed as follows: 2-heptadecyl-2-imidazoline, 14 percent by weight; N-(2-aminoethyl)-stearamide, nil percent; stearic acid, 1.0 percent by weight; ethylenediamine distearamide, 85 percent by weight. 2-heptadecyl-2-imidazoline was obtained in a yield of 55 percent, based on stearic acid, and at efficiencies of 69 percent, and 92 percent, based on ethylenediamine and stearic acid, respectively.

*Example III*

Anhydrous ethylenediamine (6,840 grams, 114 moles) which was preheated to 70° C. and triple-pressed stearic acid (6,220 grams, 21.9 moles) which was preheated to 90–100° C. were fed by means of metering pumps and allowed to mix prior to being fed in an updraft flow through a tubular reactor. The reactor comprised a Dowtherm-jacketed and electrically-heated ½-inch I.D. coiled tubular reactor fabricated from stainless steel and equipped with a thermowell, pressure regulator, and a pressure gauge. The capacity of the reactor was 1,000 milliliters. The mixture in the reactor was maintained at a temperature of 338° C., a pressure automatically regulated at 100 p.s.i.g. and with a residence time of 16 minutes.

Ethylenediamine and water were separated from the crude product in a 6-inch I.D. by 18-inch steam-jacketed stainless steel flash-evaporator. The evaporator, having a capacity of approximately 5 liters, was equipped with a total vapor-make still head, a sight glass, and a valve to control the continuous removal of the "stripped" product from the bottom of the kettle. The flash-evaporator was vented through an air-cooled condenser, a receiver, and cold traps. The conditions for "stripping" were a temperature of 200° C., a residence time of 60 to 75 minutes, and atmospheric pressure. During this operation, approximately 2.0 percent of the crude reaction product was carried over as a solid product with the ethylenediamine. The over-head liquid phase product comprised 50.1 weight percent of the reaction charge and had a composition of ethylenediamine, 82.1 percent, and water, 12.9 percent. The overhead solid phase product amounted to 2 weight percent of the reaction charge and had the following composition: 2-heptadecyl-2-imidazoline, 76.3 percent; N-(2-aminoethyl)stearamide, 20.0 percent; stearic acid, 3.2 percent. The residue from the flash-evaporator passed directly into a "weathering" still. The residue anaylzed as follows: 2-heptadecyl-2-imidazoline, 37.4 percent; N-(2-aminoethyl)stearamide, 43.6 percent; stearic acid, 1.3 percent; ethylenediamine distearamide, 17.7 percent. The "weathering" still consisted of a 5-liter, round-bottom, 3-necked, glass kettle equipped with a thermowell, a propeller-type stirrer, and a valve at the bottom to permit flow of products to the refining system. The "weathering" still was vented through a 25 mm. by 6-inch glass column (packed with 8 mm. glass rings), a total vapor-make still head, an air-cooled condenser, a receiver, and cold traps. A propeller-type agitator was used to facilitate the cyclization of N-(2-aminoethyl)stearamide to 2-heptadecyl - 2 - imidazoline. The conditions used for "weathering" were a temperature of 275° C. to 300° C., a pressure of 300 mm. Hg, and a residence time of 45 to 60 minutes. The principal overhead product obtained from the "weathering" still was water, which amounted to less than 0.1 percent of the reaction charge. The residue product from the "weathering" operation passed directly into a refining still. The "weathered" product analyzed as follows: 2-heptadecyl-2-imidazoline, 65.5 percent; N-(2-aminoethyl)stearamide, 6.1 percent; stearic acid, 1.0 percent; ethylenediamine distearamide, 27.4 percent.

The refining still consisted of a 5-liter, round-bottom, 3-necked, glass kettle equipped with a thermowell and a discharging valve at the bottom. The still included a 2 mm. by 360 mm. glass column packed with 1-inch stainless steel perforated packing. The refined product was removed through a total vapor-make still head, a steam-jacketed condenser, and a heated receiver. The refined product was taken continuously off the top at a vapor temperature of 220° to 250° C. and at a kettle temperature of 250° to 300° C. and a pressure of 1 to 3 mm. Hg. The residue was discharged at the bottom of the still and either stored for future use, or blended in with stearic acid and recycled to the reactor for further reaction with ethylenediamine. The refined product, representing 32.4 percent by weight of the total reaction charge, had the following properties: 2-heptadecyl-2-imidazoline, 96.4 percent; N-(2-aminoethyl)stearamide, 1.9 percent; stearic acid, 0.7 percent; ethylenediamine distearamide, 1.0 percent. The residue represented 12.0 percent by weight of the total charge and was analyzed as follows: 2-heptadecyl-2-imidazoline, 12.5 percent; N-(2-aminoethyl)stearamide, nil percent; stearic acid, 1.4 percent; ethylenediamine distearamide, 86.1 percent.

Under these reaction conditions of a residence time 16 minutes in the reactor, the yield of refined 2-heptadecyl-2-imidazoline was 70 percent, based on stearic acid, and the efficiency to all products was 97 percent, based on ethylenediamine. The production ratio was 74 pounds of refined product per hour per cubic foot of reactor volume.

*Example IV*

A continuous reaction, including the recycle of process residue (comprises mainly of ethylenediamine distearamide) was carried out in similar equipment to that described in Example III. A 3 to 1 weight ratio of triple-pressed stearic acid to process residues was used. Anhydrous ethylenediamine (6,780 grams, 113.0 moles) and stearic acid mixture (4,815 grams, 16.9 moles) and 1,605 grams of a process residue comprising 12.5 percent 2-heptadecyl-2-imidazoline; 1.4 percent stearic acid and 86.1 percent ethylenediamine distearamide, were reacted in a similar manner to that described in Example III. The over-head products from the flash-evaporator were obtained in the same ratio and had about the same composition as in Example III. The residue from the flash-evaporator passed directly into the "weathering" still. The residue product from the flash-evaporator analyzed as follows: 2-heptadecyl-2-imidazoline, 56.5 percent; N-(2-aminoethyl)stearamide, 12.7 percent; stearic acid, 1.3 percent; ethylenediamine distearamide, 24.5 percent. The "weathering" still was maintained under identical conditions to those described in Example III. The residue product from the "weathering" still passed directly into the refining still. The residue product from the "weathering" still analyzed as follows: 2-heptadecyl-2-imidazoline, 47.3 percent by weight, N-(2-aminoethyl)stearamide, 32.2 percent by weight; stearic acid, 1.7 percent by weight; ethylenediamine distearamide, 18.8 percent by weight. The residue product from the "weathering" still was introduced into a refining still maintained at a kettle temperature of 225° to 300° C. at a pressure of 1 to 3 mm. Hg. The refined product was obtained under identical conditions as in Example I. The refined product, representing 30.8 percent by weight of total reaction charge, had the following composition: 2-heptadecyl-2-imidazoline, 96.7 percent by weight; N-(2-aminoethyl)stearamide, 1.8 percent by weight; stearic acid, 0.6 percent by weight; ethylenediamine distearamide, 0.9 percent by weight. The residue product, representing 11.5 percent by weight of the total reaction charge, anaylzed as follows: 2-heptadecyl-2-imidazoline, 14.2 percent weight; N-(2-aminoethyl)stearamide, nil percent by weight; stearic acid, 2.2 percent by weight; ethylenediamine distearamide, 83.6 percent by weight. Under these reaction conditions of a residence time of 16 minutes in the reactor, using a 3 to 1 weight ratio of stearic acid and residue, and a mol ratio of 5.2 to 1 of ethylenediamine to stearic acid equivalents, the yield of refined 2-heptadecyl-2-imidazoline was 90.7 percent, based only on the fresh stearic acid fed to the reactor, with the efficiencies to refined product being 91.6 percent, based on stearic acid, and 99.1 percent, based on ethylenediamine. The production rate was 74 pounds of refined product per hour per cubic foot of reactor volume.

*Example V*

Anhydrous ethylenediamine (4,520 grams, 75.3 moles) which was preheated to 70° C. and triple-pressed stearic acid (4,070 grams, 14.33 moles) which was preheated to 90–100° C. were fed by means of metering pumps and allowed to mix prior to being fed in an updraft flow through a tubular reactor. The reactor comprised a Dowtherm-jacketed and electrically-heated, ½-inch I.D. coiled tubular reactor fabricated from stainless steel and equipped with a thermowell, pressure regulator, and a pressure gauge. The capacity of the reactor was 1,000 milliliters. The mixture in the reactor was maintained at a temperature of 338° C., a pressure automatically regulated at 100 p.s.i.g. and with a residence time of 25 minutes.

Ethylenediamine and water were separated from the crude product in a 6-inch I.D. by 18-inch steam-jacketed stainless steel flash-evaporator. The evaporator, having a capacity of approximately 5 liters, was equipped with a total vapor-make still head, a sight glass, and a valve to control the continuous removal of the "stripped" product from the bottom of the kettle. The flash-evaporator was vented through an air-cooled condenser, a receiver, and cold traps. The conditions for "stripping" were a temperature of 200° C., a residence time of 60 to 75 minutes, and atmospheric pressure. During this operation, approximately 2.0 percent of the crude reaction product was carried over as a solid product with the ethylenediamine. The over-head liquid phase product comprised 50.0 weight percent of the reaction charge and had a composition of ethylenediamine, 88.4 percent, and water, 11.6 percent. The over-head solid phase product amounted to 1.8 weight percent of the reaction charge and had the following composition: 2-heptadecyl-2-imidazoline, 76.3 percent; N-(2-aminoethyl)stearamide, 20.0 percent; stearic acid, 3.2 percent. The residue from the flash-evaporator passed directly into a "weathering" still. The residue analyzed as follows: 2-heptadecyl-2-imidazoline, 61.2 percent; N-(2-aminoethyl)stearamide, 23.9 percent; stearic acid, 1.5 percent; ethylenediamine distearamide, 13.4 percent. The "weathering" still consisted of a 5-liter, round-bottom, 3-necked, glass kettle equipped with a thermowell, a propeller-type stirrer, and a valve at the bottom to permit flow of products to the refining system. The "weathering" still was vented through a 25 mm. by 6-inch glass column (packed with 8 mm. glass rings), a total vapor-make still head, an air-cooled condenser, a receiver, and cold traps. A propeller-type agitator was used to facilitate the cyclization of N-(2-aminoethyl)stearamide to 2-heptadecyl-2-imidazoline. The conditions used for "weathering" were a temperature of 275° to 300° C., a pressure of 300 mm. Hg, and a residence time of 45 to 60 minutes. The principal over-head product obtained from the "weathering" still was water, which amounted to less than 0.1 percent of the reaction charge. The residue product from the "weathering" operation passed directly into a refining still. The "weathered" product anaylzed as follows: 2-heptadecyl-2-imidazoline, 79.9 percent; N-(2-aminoethyl)stearamide, 2.1 percent; stearic acid, 0.9 percent; ethylenediamine distearamide, 18.0 percent.

The refining still consisted of a 5-liter round-bottom, 3-necked, glass kettle equipped with a thermowell and a discharging valve at the bottom. The still included a 2 mm. by 360 mm. glass column packed with ¼-inch stainless steel perforated packing. The refined product was removed through a total vapor-make still head, a steam-jacketed condenser, and a heated receiver. The refined product was taken continuously off the top at a vapor temperature of 200° to 250° C., and at a kettle temperature of 250° to 300° C. and a pressure of 1 to 3 mm. Hg. The residue was discharged at the bottom of the still and either stored for future use, or blended in with the stearic acid and recycled to the reactor for further reaction with ethylenediamine. The refined product, representing 29.9 percent by weight of the total reaction charge, had the following properties: 2-heptadecyl-2-imidazoline, 99.5 percent; N-(2-aminoethyl)stearamide, nil percent; stearic acid, 0.4 percent; ethylenediamine distearamide, 0.1 percent. The residue represented 8.7 percent by weight of the total charge and are analyzed as follows: 2-heptadecyl-2-imidazoline, 14.4 percent; N-(2-aminoethyl)stearamide, nil percent; stearic acid, 1.2 percent; ethylenediamine distearamide, 84.4 percent.

Under these reaction conditions of a residence time of 25 minutes in the reactor, the yield of refined 2-heptadecyl-2-imidazoline was 82 percent, based on stearic acid, and the efficiency to all products was 98 percent, based on ethylenediamine. The production ratio was 58 pounds of refined product per hour per cubic foot of reactor volume.

*Example VI*

A continuous reaction, including the recycle of process residue (comprised mainly of ethylenediamine distearamide) was carried out in similar equipment to that described in Example V. A 3 to 1 weight ratio of triple-pressed stearic acid to process residues was used. Anhydrous ethylenediamine (3,725 grams, 62.1 moles) and stearic acid mixture (2,614 grams, 7.20 moles) and 871 grams of a process residue comprising 14.4 percent 2-heptadecyl-2-imidazoline; 1.2 percent stearic acid and 84.4 percent ethylenediamine distearamide, were reacted in a similar manner to that described in Example V. The over-head products from the flash-evaporator were obtained in the same ratio and had about the same composition as in Example V. The residue from the flash-evaporator passed directly into the "weathering" still. The residue product from the flash-evaporator analyzed as follows: 2-heptadecyl-2-imidazoline, 62.4 percent; N-(2-aminoethyl)stearamide, 22.4 percent; stearic acid, 1.3 percent; ethylenediamine distearamide, 13.9 percent. The "weathering" still was maintained under identical conditions to those described in Example V. The residue product from the "weathering" still passed directly into the refining still. The residue product from the "weathering" still analyzed as follows: 2-heptadecyl-2-imidazoline, 76.4 percent by weight; N-(2-aminoethyl)stearamide, nil percent by weight; stearic acid, 0.7 percent by weight; ethylenediamine distearamide, 22.9 percent by weight. The residue product from the "weathering" still was introduced in a refining still maintained at a kettle temperature of 225° to 300° C. at a pressure of 1 to 3 mm. Hg. The refined product was obtained under identical conditions as in Example V. The refined product, representing 31.9 percent by weight of total reaction charge, had the following composition: 2-heptadecyl-2-imidazoline, 98.8 percent by weight; N-(2-aminoethyl)stearamide, nil percent by weight; stearic acid, 0.5 percent by weight; ethylenediamine distearamide, 0.7 percent by weight. The residue product, representing 5.9 percent by weight of the total reaction charge, analyzed as follows: 2-heptadecyl-2-imidazoline, 14.3 percent by weight; N-(2-aminoethyl)stearamide, nil percent by weight; stearic acid, 2.9 percent by weight; ethylenediamine distearamide, 82.8 percent by weight. Under these reaction conditions of a residence time of 25 minutes in the reactor, using a 3 to 1 weight ratio of a stearic acid and residue, and a mol ratio of 5.2 to 1 of ethylenediamine to stearic acid equivalents, the yield of refined 2-heptadecyl-2-imidazoline was 98.7 percent, based only on the fresh stearic acid fed to the reactor, with the efficiencies to refined product being 99.5 percent, based on stearic acid, and 97.7 percent, based on ethylenediamine. The production ratio was 46 pounds of refined product per hour per cubic foot of reactor volume.

For comparison, an experiment was conducted illustrating the old method for preparing 2-heptadecyl-2-imidazoline by reacting stearic acid with ethylenediamine in the presence of diisopropyl ether as an entraining agent. This experiment, Experiment A, which follows, is outside the scope of the present invention.

EXPERIMENT A

With certain minor variations, as indicated below, substantially the same equipment was used in this experiment as was used in Example I.

The still kettle was charged with 1,457 grams (24 mols) of ethylenediamine, 1,720 grams (6.0) mols of stearic acid and 300 grams of diisopropyl ether, at ambient temperature. The still was blanketed with nitrogen and then heated for about 2 hours until a kettle temperature of 155° C. to 250° C. was reached, at a pressure of 5 to 45 p.s.i.g. Under these conditions, water formed during the reaction formed a heterogeneous azeotrope with the diisopropyl ether. The azeotrope was distilled off and collected in the decanting still head from which the lower layer of the azeotrope was removed as rapidly as it was formed. The reaction was then continued until about 95 percent by weight of the theoretical water of reaction had been removed. Approximately 87 hours were required for this step. During the distillation of the azeotrope, it was necessary to add about 480 grams of diisopropyl ether to the kettle to replace diisopropyl ether which distilled off. Approximately 338 grams of water layer of the heterogeneous distillate was collected during the 87 hour period. The non-aqueous layer of the heterogeneous distillate withdrawn during the distillation comprised about 263 grams. A diisopropyl ether-ethylenediamine fraction was collected at a vapor temperature of 100° C. to 125° C. and a kettle temperature of 150° to 240° C. at a pressure of 5 to 45 p.s.i.g. and comprised about 1,021 grams. A residue of approximately 2,091 grams remained.

Approximately 1,874 grams of residue product from the reaction kettle were charged to a refining distillation still, having a 30 x 165 mm. column packed with stainless steel sponge. Approximately 169 grams of a diisopropyl ether-ethylenediamine fraction was collected at a vapor temperature of 69° C. to 182° C., a kettle temperature of 170° C. to 246° C. at a pressure of atmospheric to 2 mm. Hg. About 1,526 grams of refined product was collected at a vapor temperature of 182° C. to 227° C., a kettle temperature of 246° C. to 271° C. and at a pressure of 1.0 to 1.1 mm. Hg, leaving a residue of about 178 grams. The refined product had the following composition: 2-heptadecyl-2-imidazoline, 99.9 percent by weight; N-(2-aminoethyl)stearamide, 0.6 percent by weight; and stearic acid, nil percent. An overall yield of 2-heptadecyl-2-imidazoline of 94.7 percent by weight was obtained, based on stearic acid, and an efficiency of 65.4 percent, based on ethylenediamine.

Unless otherwise indicated, as used throughout this specification, all parts and percentages are by weight.

The term "residence time" as used in this specification is defined as the unit volume of reaction vessel per unit volume of reactants per unit time.

This application is a continuation-in-part of Serial Nos. 633,388 and 633,401, both filed January 10, 1957.

I claim:

1. A process for the production of 2-heptadecyl-2-imidazoline which comprises bringing into reactive admixture ethylenediamine with stearic acid at a temperature of from about 150° C. to about 350° C., a pressure of from 25 p.s.i.g. to about 750 p.s.i.g., and a mol ratio of ethylenediamine to stearic acid of from 2 to 1 to 10 to 1, respectively, in the substantial absence of a reaction agent.

2. A process for the production of 2-heptadecyl-2-imidazoline which comprises bringing into reactive admixture ethylenediamine with stearic acid in a batchwise manner at a temperature of from about 150° C. to about 350° C., a pressure of from 25 p.s.i.g. to about 750 p.s.i.g., and a mol ratio of ethylenediamine to stearic acid of from 2 to 1 to 10 to 1, respectively, in the substantial absence of a reaction agent.

3. A process for the production of 2-heptadecyl-2-imidazoline which comprises bringing into reactive admixture ethylenediamine with stearic acid in a batchwise manner at a temperature of from about 150° C. to 350° C., a pressure of from 25 p.s.i.g. to about 750 p.s.i.g., and a mol ratio of ethylenediamine to stearic acid of from 2 to 1 to 10 to 1, respectively, for a period of from about 3 to about 10 hours in the substantial absence of a reaction agent.

4. A process for the production of 2-heptadecyl-2-imidazoline which comprises bringing into reactive admixture ethylenediamine with stearic acid in a batchwise manner at a temperature of from about 150° C. to about 350° C., a pressure of from 25 p.s.i.g. to about 750 p.s.i.g., and a mol ratio of ethylenediamine to stearic acid of from 3 to 1 to 5 to 1, respectively, in the substantial absence of a reaction agent.

5. A process for the production of 2-heptadecyl-2-imidazoline which comprises bringing into reactive admixture ethylenediamine with stearic acid in a batchwise manner at a temperature of from about 150° C. to about 350° C., a pressure of from 25 p.s.i.g. to about 750 p.s.i.g., and a mol ratio of ethylenediamine to stearic acid of from 3 to 1 to 5 to 1, respectively, for a period of from about 3 to about 10 hours in the substantial absence of a reaction agent.

6. A process for the production of 2-heptadecyl-2-imidazoline which comprises bringing into reactive admixture ethylenediamine with stearic acid in a batchwise manner at a temperature of from about 160° C. to about 180° C., a pressure of from 25 p.s.i.g. to about 750 p.s.i.g., and a mol ratio of ethylenediamine to stearic acid of from 3 to 1 to 5 to 1, respectively, for a period of from 3 to about 10 hours in the substantial absence of a reaction agent.

7. A process for the production of 2-heptadecyl-2-imidazoline which comprises bringing into reactive admixture ethylenediamine with stearic acid in a batchwise manner at a temperature of from about 160° C. to about 180° C., a pressure of from about 40 p.s.i.g. to about 60 p.s.i.g., and a mol ratio of ethylenediamine to stearic acid of from 3 to 1 to 5 to 1, respectively, for a period of from 3 to about 10 hours in the substantial absence of a reaction agent.

8. A process for the production of 2-heptadecyl-2-imidazoline which comprises continuously bringing into reactive admixture ethylenediamine with stearic acid at a temperature of from about 150° C. to about 350° C., a pressure of from 25 p.s.i.g. to about 750 p.s.i.g., and a mol ratio of ethylenediamine to stearic acid of from 2 to 1 to 10 to 1, respectively, in the substantial absence of a reaction agent.

9. A process for the production of 2-heptadecyl-2-imidazoline which comprises continuously bringing into reactive admixture ethylenediamine with stearic acid at a temperature of from about 150° C. to about 350° C., a pressure of from 25 p.s.i.g. to about 750 p.s.i.g., and a mol ratio of ethylenediamine to stearic acid of from 2 to 1 to 10 to 1, respectively, for a residence time of from about 8 to about 60 minutes in the substantial absence of a reaction agent.

10. A process for the production of 2-heptadecyl-2-imidazoline which comprises continuously bringing into reactive admixture ethylenediamine with stearic acid at a temperature of from about 150° C. to about 350° C., a pressure of from 25 p.s.i.g. to about 750 p.s.i.g., and a mol ratio of ethylenediamine to stearic acid of from 3 to 1 to 6 to 1, respectively, in the substantial absence of a reaction agent.

11. A process for the production of 2-heptadecyl-2-imidazoline which comprises continuously bringing into reactive admixture ethylenediamine with stearic acid at a temperature of from about 150° C. to about 350° C., a pressure of from 25 p.s.i.g. to about 750 p.s.i.g., and a mol ratio of ethylenediamine to stearic acid of from 3 to 1 to 6 to 1, respectively, for a residence time of from about 8 to about 60 minutes in the substantial absence of a reaction agent.

12. A process for the production of 2-heptadecyl-2-imidazoline which comprises continuously bringing into reactive admixture ethylenediamine with stearic acid at a temperature of from about 325° C. to about 340° C., a pressure of from 25 p.s.i.g. to about 750 p.s.i.g., and a mol ratio of ethylenediamine to stearic acid of from 3 to 1 to 6 to 1, respectively, for a residence time of from about 8 to about 60 minutes in the substantial absence of a reaction agent.

13. A process for the production of 2-heptadecyl-2-imidazoline which comprises continuously bringing into reactive admixture ethylene diamine with stearic acid at a temperature of from about 325° C. to about 340° C., a pressure of from about 90 p.s.i.g. to about 130 p.s.i.g., and a mol ratio of ethylenediamine to stearic acid of from 3 to 1 to 6 to 1, respectively, for a residence time of from about 8 to about 60 minutes in the substantial absence of a reaction agent.

References Cited in the file of this patent

UNITED STATES PATENTS 2,155,878    Waldmann et al. _____ Apr. 25, 1939